US008891483B2

(12) United States Patent
Connelly et al.

(10) Patent No.: US 8,891,483 B2
(45) Date of Patent: Nov. 18, 2014

(54) WIRELESS GATEWAY SUPPORTING A PLURALITY OF NETWORKS

(75) Inventors: Michael Connelly, Philadelphia, PA (US); Bhagabati Prasad Maharana, Bensalem, PA (US); Louis Rubin, Ruskin, FL (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 1081 days.

(21) Appl. No.: 12/544,188

(22) Filed: Aug. 19, 2009

(65) Prior Publication Data

US 2011/0044304 A1 Feb. 24, 2011

(51) Int. Cl.
*H04W 4/00* (2009.01)
*H04W 36/00* (2009.01)
*H04W 80/10* (2009.01)

(52) U.S. Cl.
CPC .......... *H04W 36/0033* (2013.01); *H04W 80/10* (2013.01)
USPC .................. 370/331; 455/456.1; 455/436

(58) Field of Classification Search
None
See application file for complete search history.

(56) References Cited

U.S. PATENT DOCUMENTS

| 2005/0122940 | A1 | 6/2005 | Nian |
| 2005/0286466 | A1 | 12/2005 | Tagg et al. |
| 2006/0153122 | A1* | 7/2006 | Hinman et al. ............... 370/328 |
| 2007/0002884 | A1 | 1/2007 | Jaakkola et al. |
| 2007/0015516 | A1* | 1/2007 | Huotari et al. ............. 455/456.1 |
| 2007/0019670 | A1 | 1/2007 | Falardeau |
| 2007/0230399 | A1 | 10/2007 | Oswal et al. |
| 2008/0133336 | A1* | 6/2008 | Altman et al. .................. 705/10 |
| 2008/0304458 | A1 | 12/2008 | Aghvami et al. |
| 2009/0073943 | A1* | 3/2009 | Krishnaswamy et al. ..... 370/338 |
| 2009/0323659 | A1* | 12/2009 | Zhang ........................... 370/338 |
| 2010/0015993 | A1* | 1/2010 | Dingler et al. ............. 455/456.1 |
| 2010/0146614 | A1* | 6/2010 | Savoor ............................ 726/10 |
| 2010/0157825 | A1* | 6/2010 | Anderlind et al. ............ 370/252 |

FOREIGN PATENT DOCUMENTS

EP 2007161 A1 12/2008

OTHER PUBLICATIONS

European Search Report, Application No. 10 172 516.6, 7 pages, dated Oct. 19, 2010.
HGI Home Gateway Initiative, Home Gateway Technical Requirements; Residential Profile; Version 1.0, dated Apr. 29, 2008, Copyright 2008, 125 pages.
Home Gateway Initiation—Vision; Evolution of the broadband market to date, Copyright 2007, 2 pages.
Home Gateway Initiative; What is a residential Gateway for? Copyright 2007, http://www.homegatewayinitiative.org/info/Whatis.html, downloaded May 13, 2009, 1 page.

(Continued)

*Primary Examiner* — Mohammad Adhami
(74) *Attorney, Agent, or Firm* — Banner & Witcoff, Ltd.

(57) ABSTRACT

In accordance with various aspects of the disclosure, systems and methods are illustrated for an apparatus comprising a modem component, a wireless communications component, at least one processor, and at least one tangible electronic memory storing data and numerous computer-executable modules to enable wireless hotspots with multiple network identifiers. Examples of at least some of the computer-executable modules includes, but is not limited to an input module, network identifier module, session management module, network management module, automatic location management module, authentication module, bandwidth negotiation module, billing interface module, and activity-based location module.

19 Claims, 10 Drawing Sheets

(56) References Cited

OTHER PUBLICATIONS

Lessnetworks.com; White Paper: Authenticated Access Decreases Service Abuse, Eases Burden for New Government Compliance, and Reduces Liability; Dec. 5, 2007; http://www.news.com/8301-13578_3-9829759-38.html?tag=nefd.top, 4 pages.

PublicIP; Control Your Users; http://www.publicip.net/user_control.php?PHPSESSID=Ode7b7b87f878 . . . ; downloaded Apr. 22, 2009, 2 pages.

Setting Up a Free Hotspot; http://www.fingerlakeswifi.com/info_wifi_setup.shtml, downloaded Apr. 22, 2009, 3 pages.

Wikipedia, Cable Internet, http://en.wikipedia.org/wiki/Cable_Internet, downloaded May 13, 2009, 2 pages.

Wikipedia, Cable Modem, http://en.wikipedia.org/wiki/Cable_modem, downloaded May 13, 2009, 4 pages.

Wikipedia, Cable modem termination system, http://en.wikipedia.org/wiki/Cable_modem_termination_system; downloaded May 13, 2009, 2 pages.

Wikipedia, DOCSIS, http://en.wikipedia.org.wiki/DOCSIS, downloaded May 13, 2009, 4 pages.

Wikipedia, Verizon FiOS, http://en.wikipedia.org/w/index.php?title=Verizon_FiOS; downloaded May 19, 2009, 7 pages.

Wikipedia, Residential Gateway, http://en.wikipedia.org/wiki/Residential_gateway, downloaded May 13, 2009, 3 pages.

Home Gateway—A Key to Open Digital Home, Copyright Huawei Technologies Co., Ltd. 1998-2009, http://huawei.com/news/view.do?id=89&cid=43&print=true, downloaded May 13, 2009, 2 pages.

Fonera+ Technical Specifications, https://shop.fon.com/FonShop/shop/US/ShopController?view=product& . . . , downloaded Apr. 22, 2009, 1 page.

Wikipedia, Suggestions from FON Wiki Beta, http://wiki.fon.com/wiki/Suggestions, downloaded Apr. 22, 2009, 4 pages.

\* cited by examiner

FIG. 6    600

WIRELESS GATEWAY SUPPORTING A PLURALITY OF NETWORKS

TECHNICAL FIELD

Aspects of the disclosure relate to wireless networking. More specifically, aspects of the disclosure relate to a service provider network supporting numerous wireless hotspots.

BACKGROUND

In the present day, the evolution of wireless devices such as laptops, mobile phones and other portable computer devices, facilitates instantaneous access to a wireless network, and enables connectivity to the Internet at virtually any location, providing users the mobility to move around within a broad coverage area and still be connected to the network. Recent years have witnessed the development of smart phones and wireless devices to carry data in addition to telephone conversations. Currently, these devices are connected to the wireless network via a dedicated network provided either in the home or in Wi-Fi hotspots installed by a service provider in a geographical region. Currently, the coverage area of such hotspots is limited to the area covered by the dedicated equipment installed by the service provider.

Furthermore, to provide seamless access over wireless cellular networks, service providers are laying out hotspots with dedicated equipment at high foot print areas and with huge investment costs. Although technologies are known for use with cellular phones for session management on these devices, this technology requires the installation of expensive cellular towers with a plethora of obstacles and shortcomings.

Moreover, many solutions provide limited WLAN access methods where the remote user receives corresponding service set identifier (SSID) beacons from the modems and choosing a suitable network service provider. These beacons, being transmitted to a limited radius, may not provide seamless connectivity during commute, and end users may be confused as to which SSID will provide fastest service. Also as more users are allowed to connect to a hotspot, bandwidth allocated to each party is restricted, sometimes resulting in very slow connectivity.

Therefore, there is a need in the art for the numerous novel and non-obvious aspects of the disclosure.

BRIEF SUMMARY

The following presents a simplified summary of the disclosure in order to provide a basic understanding of some aspects. It is not intended to identify key or critical elements or to delineate the scope of the disclosure. The following summary merely presents some concepts of the disclosure in a simplified form as a prelude to the more detailed description provided below.

An apparatus comprising a modem component, a wireless communications component, at least one processor, and at least one tangible electronic memory storing numerous computer-executable modules and data is disclosed. Examples of at least some of the computer-executable modules includes an input module, network identifier module, session management module, network management module, automatic location management module, authentication module, bandwidth negotiation module, billing interface module, and activity-based location module. One of skill in the art will appreciate in view of the disclosure that there may be other modules to support operations, administration and maintenance activities of the apparatus.

One skilled in the art will appreciate that numerous aspects of the disclosure may operate on various service provider networks or other known functionally similar network architectures. For example, embodiments of an apparatus in accordance with various aspects of the disclosure could communicate over a service provider network using any wire line or wireless network.

Moreover, a method of operating the apparatus is disclosed. The method includes storing commands and network identifiers, transmitting session data to a remote service provider network system, and requesting and receiving data. Embodiments can be partially or wholly implemented on a computer-readable medium, for example, by storing computer-executable instructions or modules, or by utilizing computer-readable data structures.

Of course, the methods and systems of the above-referenced embodiments may also include other additional elements, steps, computer-executable instructions, or computer-readable data structures. In this regard, other embodiments are disclosed herein as well. The details of these and other embodiments are set forth in the accompanying drawings and the description below. Other features and advantages of the embodiments will be apparent from the description and drawings, and from the claims.

BRIEF DESCRIPTION OF THE DRAWINGS

The present disclosure is illustrated by way of example and not limited in the accompanying figures in which like reference numerals indicate similar elements and in which.

DETAILED DESCRIPTION

In accordance with various aspects of the disclosure, systems and methods are illustrated for an apparatus comprising a modem component, a wireless communications component, at least one processor, and at least one tangible electronic memory storing numerous computer-executable modules and data. Examples of at least some of the computer-executable modules includes, but are not limited to an input module, network identifier module, session management module, network management module, automatic location management module, authentication module, bandwidth negotiation module, billing interface module, and activity-based location module. The modules, in combination with one or more systems, behave as a wireless gateway (e.g., residential or business) for providing wireless services to users, both private and public. Aspects of the disclosure present a gateway for providing WiFi services that use customer-premise equipment for providing service without requiring the service provider to install dedicated equipment at each site. The wireless gateway increases the provider's coverage (e.g., geographic coverage) and reduces cost of deployment. In one embodiment, aspects of the disclosure can serve to supplement a home users' income by generating income based on the usage of the wireless gateway by public users paying a fee to the service provider and/or homeowner.

Figure 1:
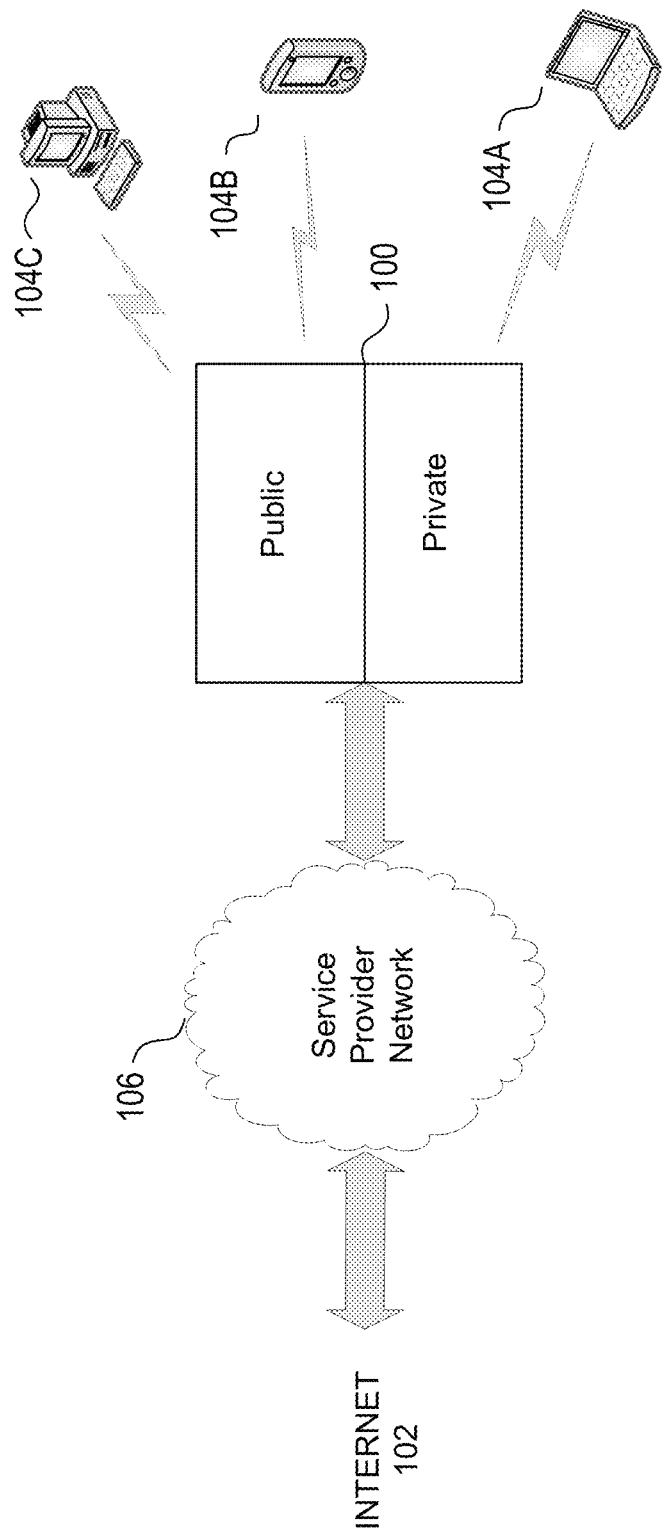
FIG. 1 illustrates a schematic diagram of a network operating environment in which various aspects of the disclosure may be implemented.

FIG. 1 illustrates an example of a suitable computing system environment that may be used according to one or more illustrative embodiments of the disclosure. The illustrated computing system environment is only one example of a suitable computing environment and is not intended to suggest any limitation as to the scope of use or functionality of the disclosure. The illustrated computing system environment should not be interpreted as having any dependency or requirement relating to any one or combination of components in a computing system environment.

Wireless gateway 100 may serve as a hotspot (or wireless access point) for one or more users 104A, 104B, 104C. The gateway 100 may provide a backhaul connection to the Internet 102 (e.g., world wide web, e-mail, ftp, etc.) through a service provider network 106. The hotspot may be able to route different media formats such as data, voice and/or video and would be able to support unicast, broadcast and/or multicast traffic. The wireless gateway 100 may provide different networks for the users. For example, a first user 104A may connect to a first network provided by the wireless gateway 100. Meanwhile, other users 104B, 104C may connect a second network, different from the first network, provided by the wireless gateway 100. For example, a laptop with wireless 802.11a/b/g capabilities may connect in such a configuration. Other examples of user devices include, but are not limited to, personal computers, server computers, hand-held or laptop devices, multiprocessor systems, microprocessor-based systems, set top boxes, programmable consumer electronics, network PCs, minicomputers, mobile or cellular phones, smart phones, netbook computers, media player devices, entertainment device, and game consoles.

Figure 5:
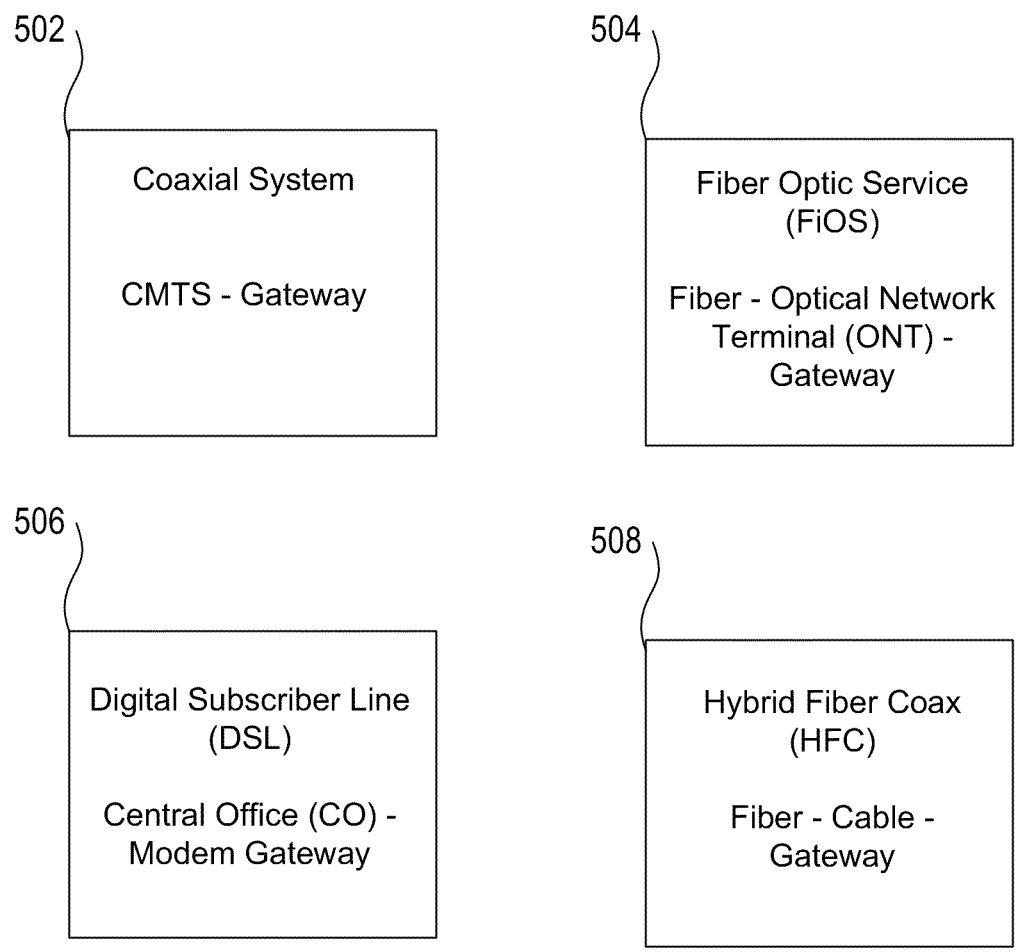
FIG. 5 illustrates some exemplary network architectures in accordance with various aspects of the disclosure.

A service provider network 106 in accordance with various aspects of the disclosure may be embodied in various different network architectures. FIG. 5 illustrates at least some of such architectures. For example, service provider network 106 may be designed as a coaxial system 502 comprising a cable modem termination system (CMTS) communicating with numerous gateways (e.g., gateway 100). In another embodiment, the service provider network 106 may be designed as a fiber optic service (FiOS) system 504 comprising optical fibers extending from an optical line terminal (OLT) to numerous optical network terminals (ONTs) at user's homes. The ONTs may communicate with a gateway 100 located near or in the user's home. In yet another embodiment, the service provider network 106 may be designed as a digital subscriber line (DSL) system 506 comprising a central office communicating with a modem gateway 100. In yet another embodiment, the service provider network 106 may be designed as a hybrid fiber coax (HFC) 508 where Internet traffic is routed over both optical and coaxial wire in making its way to the user's home systems (e.g., gateway 100). One skilled in the art will appreciate that numerous aspects of the disclosure may operate on one or more of the aforementioned service provider networks or other known or future-developed network architectures. For example, the apparatus (e.g., gateway 100) could be connected to the service provider network using any wire line or wireless network and this disclosure covers all types (e.g., DSL, cable, wireless, fiber optic, etc.) of provider networks.

Figure 2:
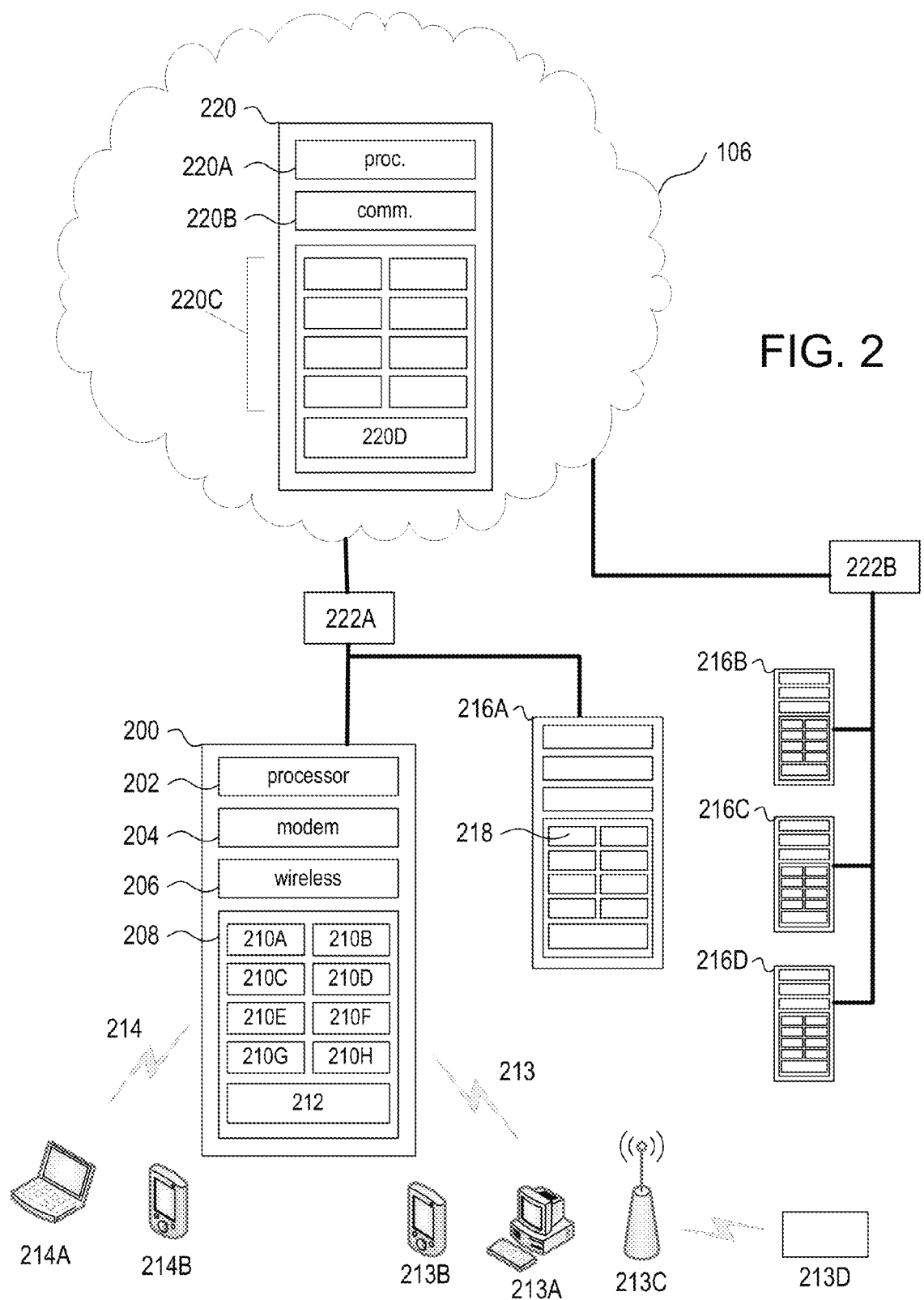
FIG. 2 illustrates a diagram of at least some of the numerous components, modules, and systems involved in the implementation of various aspects of the disclosure.

FIG. 2 shows an apparatus 200 operating in accordance with illustrative embodiments of the disclosure. The apparatus 200 comprises a modem component 204, a wireless communications component 206, at least one processor 202, and at least one tangible electronic memory 208 storing numerous computer-executable modules 210 and data 212. Implementations of such an apparatus may be embodied, for example, with the use of modems providing Internet services (e.g., broadband modems, cable modems, etc.), telephone equipment (e.g., EMTA, EDVA, Voice-over-IP, terminal adapters, etc.), or any other device or combination of devices capable of providing a wireless connection that can route traffic from the wireless device to a backhaul connection.

The modem component 204 in accordance with various disclosed aspects may be configured to transmit data to a remote service provider network system 220 over at least a partially wired network (e.g., wired connection between apparatus 200 and remote telecommunications equipment 222A). The modem component 204 may also receive data from the remote network system 220. One of skill in the art will appreciate that the modem component 204 in the apparatus 200 may include commonly known electrical devices and mechanisms used in conventional communication devices (e.g., broadband modems, DOCSIS 2.0, DOCSIS 3.0, metro Ethernet end devices, fiber optic terminals, etc.) for transmitting and receiving data.

A wireless communications component 206 in accordance with various disclosed aspects may be configured to wirelessly transmit data to user devices (e.g., devices 213A, 213B, 214A, 214B, etc.) The wireless communications component 206 may operate using conventional wireless technologies, such as 802.11a/b/g/n, WiMax, and others. Moreover, the wireless communications component 206 may be configured to broadcast a plurality of network identifiers (e.g., Service Set Identifiers (SSIDs)) to the user devices using a network identifier module 210B. In one example, the wireless communications component 206 may broadcast on different channels, different VLANs, and/or using different physical layer technologies. The wireless communications component 206 may also receive data from the user devices. One of skill in the art will appreciate that the wireless communications component 206 in the apparatus 200 may include commonly known electrical devices and mechanisms used in common communication devices (e.g., wireless routers commonly used in residential networking) for transmitting and receiving data.

In one embodiment in accordance with various aspects of the disclosure, the modem component 204 and the wireless communications component 206 may be physically located in the same device. Such a fully-integrated device may allow bi-directional data communication with a remote network 106 via radio frequency channels. The device may also allow wireless radio frequency communication with user devices 214A, 214B, etc. Alternatively, the modem component 204 and the wireless communications component 206 may be located in separate, distinct devices. The modem component 204 may be located outside a user's home in or near an optical network terminal (ONT), for example, while the wireless communications component 206 may be located in a router or gateway in the user's home. In yet another embodiment, both the modem component 204 and wireless communications component 206 may be located outside the user's home, but still provide Internet access to the user. In yet another alternative embodiment, the service provider may provide a modem component 204 and various other components, while the user provides a wireless component (e.g., wireless component 206 or a second wireless component in addition to one provided by the service provider) configured to provide wireless services to other public users in accordance with various aspects of the disclosure.

The modules, in combination with one or more systems, may behave as a wireless gateway (e.g., at a residential location or business location) for providing wireless services to users, both private and public. Aspects of the disclosure present a gateway for providing WiFi services that use customer-premise equipment (CPE) for providing both private and public service, without requiring the service provider to install dedicated equipment at each site (or multiple equipment at the same site). The disclosed wireless gateway increases the provider's coverage (e.g., geographic coverage) and reduces cost of deployment. In an alternative embodiment, disclosed aspects can serve to supplement a home users' income by generating income based on the usage of the wireless gateway by public users paying a fee to the service provider and/or homeowner.

The apparatus 200 further includes at least one processor 202 configured to execute at least computer-executable modules (e.g., modules 210A, 210B, etc.) and/or computer-executable instructions stored in memory (i.e., a computer-readable medium) in the apparatus. The processor 202 may be a conventional Intel® (or other chip manufacturer) microprocessor or System On chip device or any other device known to one of skill in the art. Electronic memory 208 may include all types of computer storage media, for example volatile and nonvolatile, removable and non-removable media implemented in any method or technology for storage of information such as computer readable instructions, data structures, program modules or other data. Other examples include, but are not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information accessible by a processor.

The electronic memory or memories 208 in the apparatus 200 may store numerous computer-executable modules, including an input module 210A that is configured to store at least data (e.g., commands and other data) received from a remote service provider network system 220. Such commands may be sent from a remote network system 220 and transmitted through remote telecommunications equipment 222A and the modem component 204. In one example, a command may be a binary (or hexadecimal or other format) code that is identifiable by the apparatus as mapping to a particular command. One skilled in the art will appreciate that numerous techniques exist for implementing such a command architecture. Some examples of commands in accordance with aspects of the disclosure include, but are not limited to, a session transfer command, a bandwidth command, an authentication command, a location command, an activity-based location command, and/or a network management command. In some examples, a command may include a payload portion containing other information associated with the command or execution of the command. For example, a network management command, in some examples, may include a network identifier (e.g., an SSID) corresponding to the network to be enabled at an apparatus 200.

In another example, the electronic memory or memories 208 in the apparatus 200 may store numerous computer-executable modules, including a network identifier module 210B that is configured to wirelessly transmit a plurality of network identifiers using the wireless communications component 206. After receipt of a network management command, the network identifier module 210B may configure the wireless communications component 206 to publicly broadcast a particular network identifier (e.g., an SSID) to all user devices (e.g., devices 213A, 213B, etc.) within proximity to the apparatus. Such a communications network, publicly broadcasting the network identifier, may be referred to as a public network. In some examples, the network identifier (i.e., public network identifier) publicly broadcast from the apparatus 200 may be sent from a remote service provider network system 220. As such, the public network may be dynamically configurable from the remote network system 220, including, but not limited to, to indicate which channel a public network shall communicate, which network identifier to broadcast, and/or whether the network identifier should be publicly broadcast. Other examples of settings that may be configured on the apparatus 200 will be apparent to one skilled in the art after review of the disclosure.

Alternatively, the wireless communications component 206 may be configured to receive data from and communicate with user devices that can already properly identify a particular network identifier, and does not actively broadcast the network identifier to unknown user devices. Such a communications network may be referred to as a private network. For further security considerations, data communicated over a private network may be encrypted (e.g., using WEP encryption or other techniques). Once a user connects to a private network 214, the eligible services, such as voice, data etc., will all be made available only to the private user 214A, 214B. In another embodiment, the private network may be any network, whether its SSID is broadcast or not, where the network is restricted to those authorized to access it (e.g., family members, invited guests, etc.)

In some examples, a single apparatus 200 may nearly simultaneously communicate with user devices on a public network 213 and the private network 214. Moreover, data communications over the public network 213 and private network 214 may be compartmentalized such that data communicated on the private network 214 cannot be intercepted and used nefariously by user devices on the public network 213. For example, a firewall (or similar device) may implement security algorithms to differentiate the public and private user device's traffic (e.g., using VLAN technology). At least one benefit of such a compartmentalized approach is that user devices (e.g., devices 214A, 214B, etc.) on the private network 214 are protected from malicious users on the public network 213. In some alternative embodiments, the apparatus 200 may include additional computer logic to allow data communication to bridge between the private network 214 and the public network 213. For example, the device 214B on the private network 214 may wish to communicate with another device 213B on the public network 213. After the proper authentication routines have been successfully performed, the devices may be permitted such access. In another example, the aforementioned additional logic may be located at the service provider network system 220. For example, before a device on 214B on the private network 214 is granted access to another device 213A on the public network 213, the request may be sent to the service provider network system 220 for authentication and approval.

In another example, data communicated on both the public network 213 and private network 214 may be encrypted; however, the data may be encrypted separately such that the level of encryption on the private network is higher (i.e., more secure) than the level of encryption on the public network. At least one benefit of some of the aforementioned embodiments is that an owner of an apparatus 200 may use a private network 214 to perform secure operations with a reasonable expectation of safety while other roaming user devices 213B (e.g., third-party subscribers) can access a public network 213 on the same apparatus 200 without compromising the private network 214. In an alternate embodiment, multiple public networks and multiple private networks may be provided to cater to different categories of users. In one example, one public network may only offer services to wireless subscribers of the service provider, while another public network may provide services to third party subscribers. Meanwhile, one private network may provide services to the user's device, while a guest (e.g., public) network may provide them for guests to the user's home or office.

In another example, the electronic memory or memories 208 in the apparatus 200 may store numerous computer-executable modules, including a session management module 210C, that is configured to transfer session data of a user device (e.g., device 213A) on the public network 213 to the remote service provider network system 220 through the modem component 204. Session management involves maintaining the session of a wireless user device 213A so that it retains its session with an apparatus 200 and permits seamless transition to another apparatus 216A when the user device 213A is nomadic (i.e., moving). In one example, session data may be maintained locally at the apparatus 200, and the apparatus 200 may proxy traffic to an upstream network after establishing a session with the upstream network. In accordance with various disclosed aspects, session data may comprise information associated with data communicated on the public network by the user device. For example, the session data may include a username and password, used to authenticate the user device.

Receipt of a session transfer command sent from the remote service provider network system 220 may trigger a transfer of session data by the session management module 210C. Alternatively, the session management module 210C may be configured to periodically backup session data to the remote network system 220 after receipt of a session transfer command. For example, in some instances, the remote network system 220 may detect that a user device 213B is in motion and/or frequently changing public networks. As such, the session transfer command may be issued such that upon receipt of the command at the session management module 210C, the module begins to transfer session data to the network system 220 repeatedly (e.g., at predetermined intervals, upon the occurrence of particular events, etc.) to further a seamless transition of the user device 213B between different public networks (e.g., a transition from apparatus 200 to apparatus 216A). In such an example, the remote network system 220 may transfer session data received from the session management module 210C in the apparatus 200 to a different apparatus 216A using the new apparatus's session management module 218. The mobile user device 213B may be moving from the first public network 213 associated with apparatus 200 to a different location where the public network of a different apparatus 216A may be present. Meanwhile, in an alternative embodiment, the user device 214A may be moving from a private network 214 (e.g., in his/her home) to a public network in an area outside their home. In such an embodiment, the remote network system 220 may instruct the session management module 210C to transfer session data to the appropriate apparatus enabling the public network. The session management module in the new apparatus may then be responsible for managing the session data while the user device continues to communicate on its network. It both instances described above, a proper handoff of the session data (e.g., session parameters, authorization procedures, updated charge data records, location update for emergency services, etc.) may be prudent to ensure seamless transition between networks.

In another embodiment, the transfer of session data between two apparatuses corresponding to different networks may proceed as described below. First, a user device 213A may authenticate with a backend application. In one example, the authentication occurs automatically without manual intervention by a user of the user device 213A. In another example, the user enters a username and password that is compared against a secure data store of authorized usernames and respective passwords to ensure that the user/user device is authorized to access the network. Next, as the user device 213A travels to a new location, the original network available via an apparatus 200 may no longer be detectable by the user device 213A. The user device 213A may seamlessly search for a new network and automatically connect once a compatible network (e.g., a public network in communication with the service provider network system 220) is identified. The user device 213A then connects to the apparatus 216A, for example, of the new compatible network. The user device 213A may provide active session data to the new apparatus 216A for session handoff. The session management module 218 of the new apparatus 216A may facilitate the handoff of the session from the previous apparatus 200 to the new apparatus 216A. The remote network system 220 plays an integral role in transferring the session data between the apparatuses as explained earlier. Moreover, in some embodiments, the apparatus and/or remote network system may identify the best network for the user device's use. For example, when multiple networks are available to the user device, the apparatus and/or remote network system may select the best network for the user device (e.g., selecting a private network over a public network when the user device is within the user's home.) In some embodiments, the user device may include software modules configured to provide and/or report its signal strength with an apparatus to that apparatus, for example, in use for reporting to the remote network system.

Once the session data has been transferred and the new apparatus 216A has established a session for the user device 213A, the apparatus 216A may trigger one or more other modules residing in the apparatus. For example, the automatic location management module of apparatus 216A may update the location of the user device 213A, e.g., for purposes of E911 compliance. Likewise, the authentication module, network management module, and/or billing interface module of apparatus 216A may update charge (i.e., fee) information or other information (e.g., the start and stop time of usage of the particular network, etc.) for the user's usage of the network for other billing or statistical purposes. The remote network system 220 may be configured to allow multiple parameters to be maintained for the user device 213A by mapping the duplicate parameter values to their corresponding apparatuses. For example, a start and stop time may be stored for the user device's usage of both apparatus 200 and apparatus 216A without conflicting and/or overwriting prior session data.

In another example, the electronic memory or memories 208 in the apparatus 200 may store numerous computer-executable modules, including a network management module 210D that is configured to support seamless transition of the user device between different networks. For example, user device 213A on the public network 213 may transition to a different network being broadcast by apparatus 216A. The two networks may be different physical public networks in one example. In an alternative embodiment, the transition may be from a private network 214 at a user's residence to a public network disseminating from apparatus 216A, which may be another apparatus having a private and public network. In yet another example, the transition may be over different physical networks, such as WiMax, Femto, and/or cellular networks. For example, the user device 213A may transition from a public network 213 over remote telecommunications equipment 222A (e.g., telecommunications equipment for use to enable broadband cable access) to a different public network being disseminated over a cellular network (e.g., through telecommunications equipment 222B). In such an embodiment, the apparatus 216B corresponding to the telecommunication equipment 222B may include a network management module to facilitate seamless transition of user services.

Figure 9:
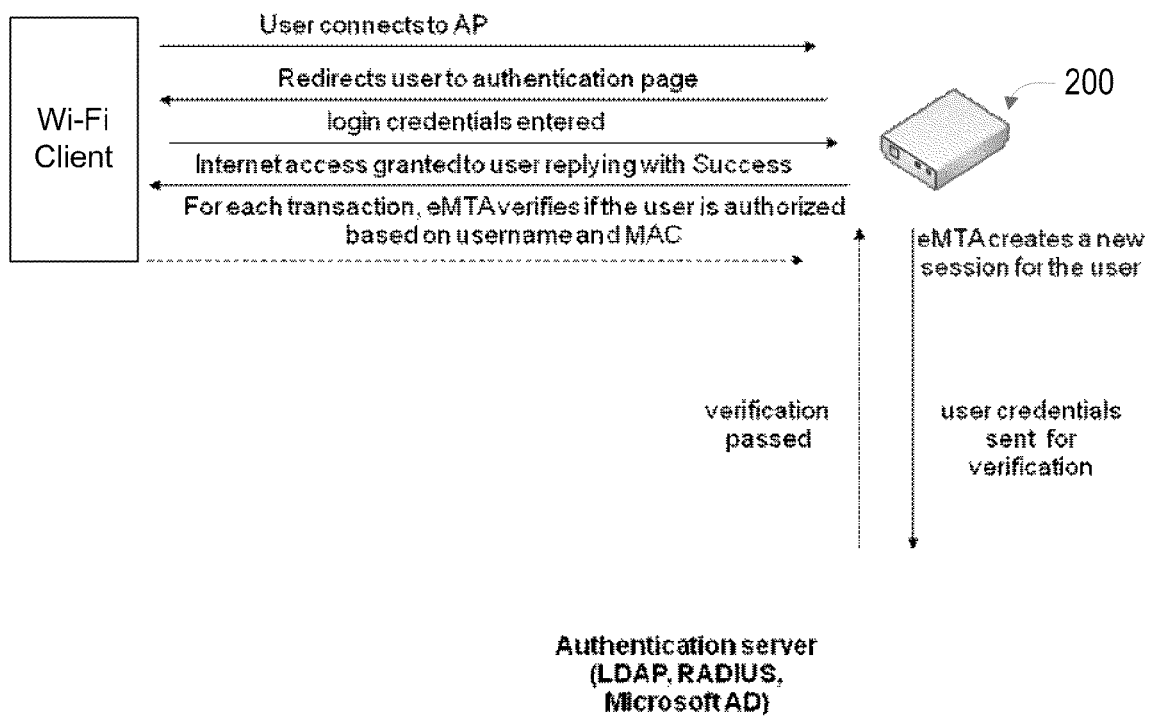
FIG. 9 illustrates an apparatus authenticating a user device in accordance with various aspects of the disclosure.

In another example, the electronic memory or memories 208 in the apparatus 200 may store numerous computer-executable modules, including an authentication module 210F that is configured to restrict use of the public network 213 to only those user devices approved by the service provider network system 220. Referring to FIG. 9, when a user device attempts to establish a connection with an apparatus 200, the user device may be required (either manually or automatically), in some examples, to authenticate itself with the assistance of an authentication module 210F in the apparatus 200. In one embodiment, the apparatus 200 may store an abbreviated authentication table that is populated with values transmitted in association with an authentication command. The authentication command may be transmitted from the service provider network system 220 with associated information useful for authenticating and authorizing access to the public network 213. Consequently, the apparatus 200 may authenticate the user device using the authentication module 210F and this information. At least one benefit of the aforementioned embodiment is that the apparatus 200 may more quickly authenticate the user device 213A because an abbreviated authentication table is cached in local memory 208.

Figure 7:
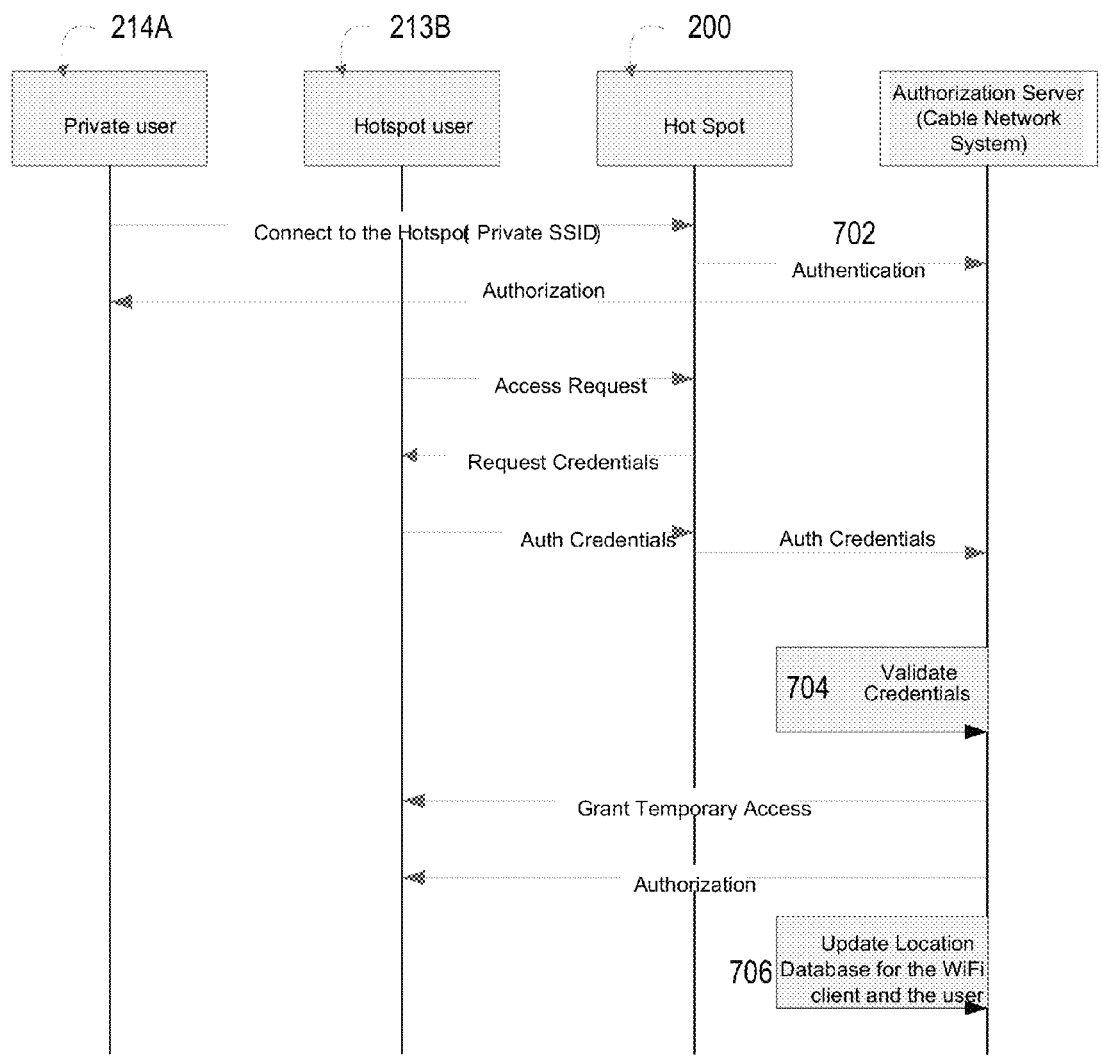
FIG. 7 illustrates an exemplary data communication among devices attempting to obtain authentication in accordance with aspects of the disclosure.

In an alternative embodiment, the apparatus 200 may communicate with the service provider network system 220 through the authentication module 210F to determine if the user device should be allowed access to the public network 213. Referring to FIG. 7, in such an embodiment, the authentication command sent from the service provider network system 220 may include an approval or rejection (e.g., a Boolean true or false) to indicate whether the apparatus 200 should or should not grant the user device 213A access to the public network 213. For example, an authorization server at the service provider network 106 may grant temporary access to a hotspot user (e.g., public user 213B) in cooperation with authentication commands 702. As such, the authentication module 210F stored in local memory 208 may restrict use of the public network 213 to only those users approved by the service provider network 106. Moreover, the service provider network system 220 can dynamically update the numerous public networks to permit or block usage of particular user devices. For example, referring to FIG. 7, a private user 214A may receive authorization from an authorization server at the service provider network 106 after requesting authentication through a hotspot 200. In another example, as explained earlier, the hotspot 200 may store an authentication table in local memory 208 and be able to authorize the private user 214A without requiring access to a remote cable network system 220. In yet another example, a hotspot 200 may enforce authentication policies that require credentials to be validated 704 based on inactivity or after a predetermined threshold amount of usage or service. Finally, in some examples, the authorization server may update 706 the location of a WiFi user device on a periodic (or other) basis.

In another example, the electronic memory or memories 208 in the apparatus 200 may store numerous computer-executable modules, including a bandwidth negotiation module 210G that is configured to manage bandwidth allotted to data communicated on the public network 213. In one example, a cable modem termination system (CMTS) may interact with the module 210G to assist in managing the bandwidth. A bandwidth command sent from the remote network system 220 may cause the bandwidth negotiation module 210G to implement (or activate) the appropriate rules to manage the allocated bandwidth. The bandwidth negotiation module 210G may manage the quality of service ("QoS") and allocate bandwidth for an apparatus 200 such that predetermined services may be capable of being provided to the user device 213A.

Figure 6:
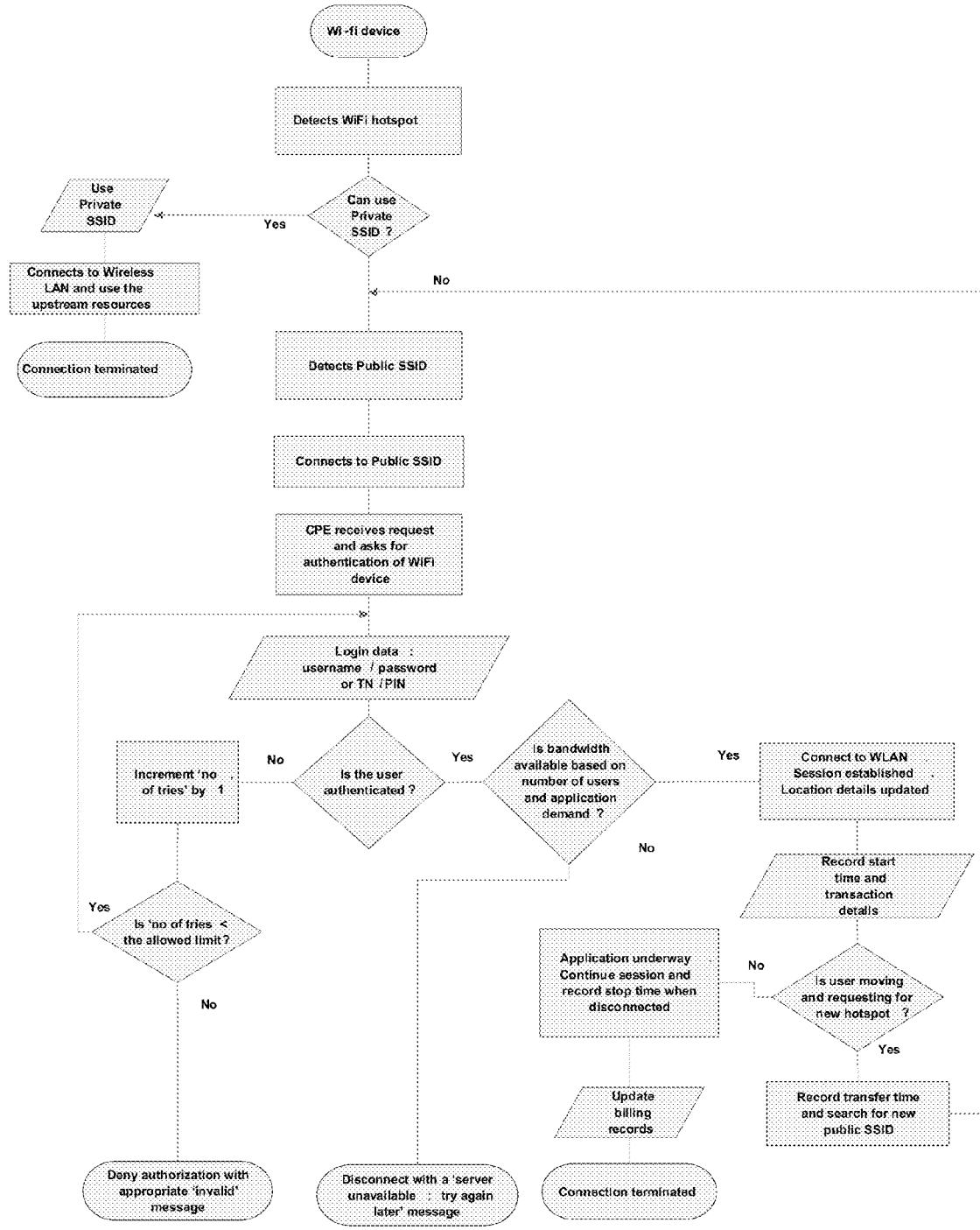
FIG. 6 is a flowchart in accordance with various aspects of the disclosure.

For example, as illustrated in FIG. 6, a public user device may be authenticated, then immediately it may be determined if sufficient bandwidth remains for the new user. If not enough bandwidth remains, the user may be disconnected and shown a "try again later" (or comparable) message. The available bandwidth may be measured based on the number of users and/or the bandwidth requirements of applications. If sufficient bandwidth remains for the user, the user may be connected to the wireless LAN and a session established (if the user is new). Moreover, information about the location of the user may also be collected and stored. In addition, the start time of the session may be recorded for, inter alia, billing purposes. Other features are disclosed in FIG. 6 for consideration in view of the other features and descriptions disclosed herein.

In another example, the bandwidth negotiation module 210G may prevent a single user device 213A from hijacking the network by consuming all or most of the network's (e.g., apparatus 200) bandwidth. Moreover, since the public network 213 and private network 214 share a common backhaul connection to remote telecommunication equipment 222A, the bandwidth negotiation module 210G plays a primary role in ensuring that the desired QoS and bandwidth is available to the network (i.e., private network 214). In one example, the bandwidth consumption of a user device 214A on the private network 214 may take precedence over those of any devices on the public network 213. In another example, the remote network system 220 may provide rules (e.g., bandwidth allocation instructions) in association with bandwidth commands. The rules may instruct the bandwidth negotiation module 210G in allocating the bandwidth and QoS requirements at the apparatus 200. For example, these rules may guide the allocation of bandwidth at a granular level (e.g., a session level, a device level, etc.) and indicate that some applications may have higher priority than others (e.g., emergency services such as E911 may have top priority).

Figure 3:
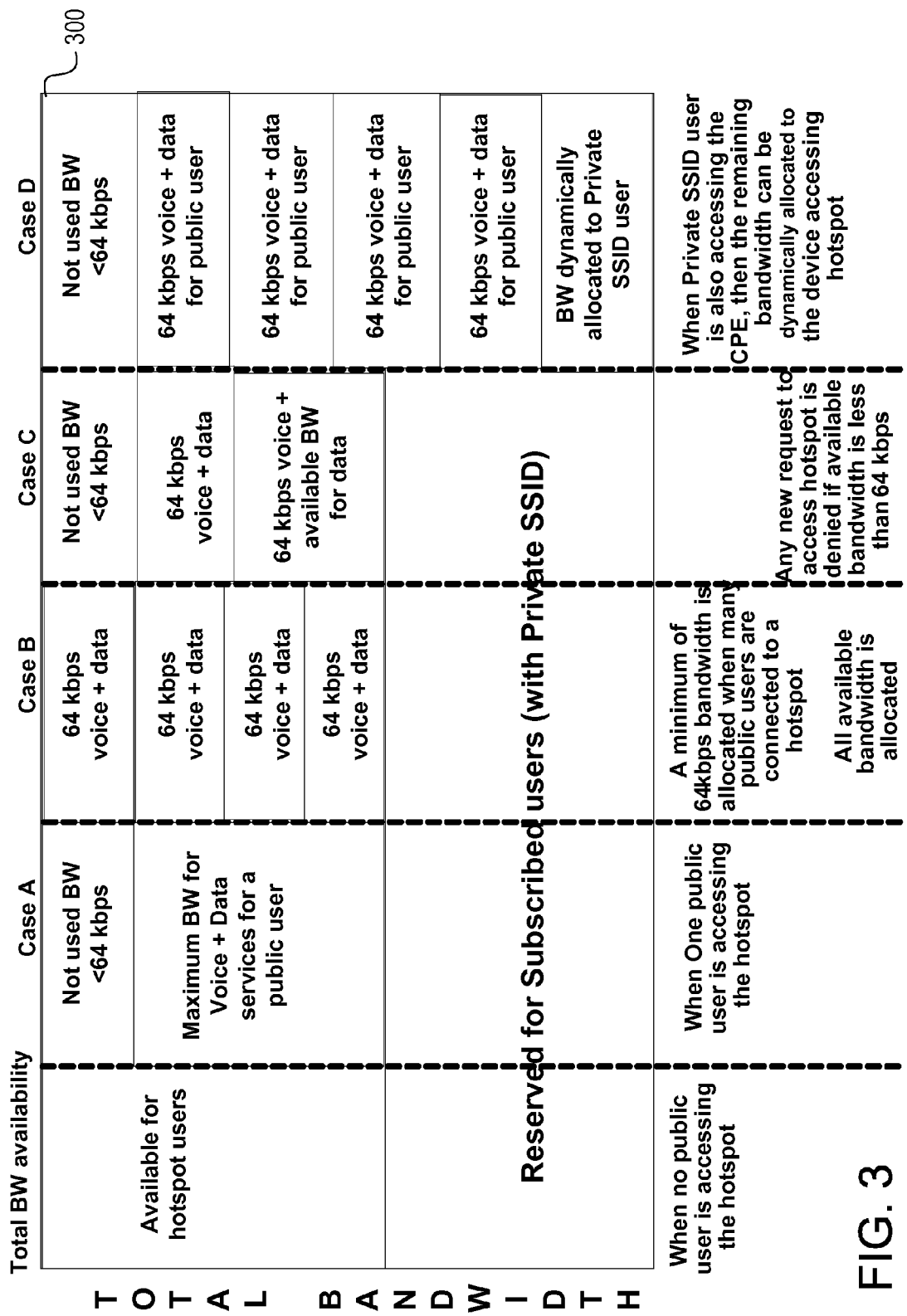
FIG. 3 illustrates numerous use cases in accordance with a bandwidth negotiation module in accordance with various aspects of the disclosure.

Referring to FIG. 3, in numerous use cases in accordance with various aspects of the disclosure, bandwidth 300 may be statically allocated for user devices 214A, 214B on the private network 214. The remaining bandwidth may be available for the public network 213. Each user device may be initially allocated a fixed amount of bandwidth and based on the particular device's requirement (i.e., application running on the device) more bandwidth can be dynamically allocated. In some examples, a minimum bandwidth may need to be allocated for each user device to service basic applications and to guarantee service levels and QoS. If a large quantity of user devices connect to an apparatus 200 and it is not possible to allocate the minimum bandwidth for a user device (i.e., the threshold limit, e.g. 64 kbps as shown in FIG. 3) then the user device may be rejected permission to connect to the apparatus 200 (see case C in FIG. 3). In another example, when a user device 214A on the private network 214 is accessing an apparatus 200 concurrently with a number of user devices 213A on the public network 213, then the apparatus 200 may dynamically allocate only the required amount of bandwidth to the private user 214A and apply the remaining bandwidth to public users 213A (see case D in FIG. 3). In that case, if the private user 214A requires additional bandwidth, but within the subscribed limit, then the bandwidth negotiation module 210G in the apparatus 200 may reduce the bandwidth allocated to the public network 213.

Figure 10:
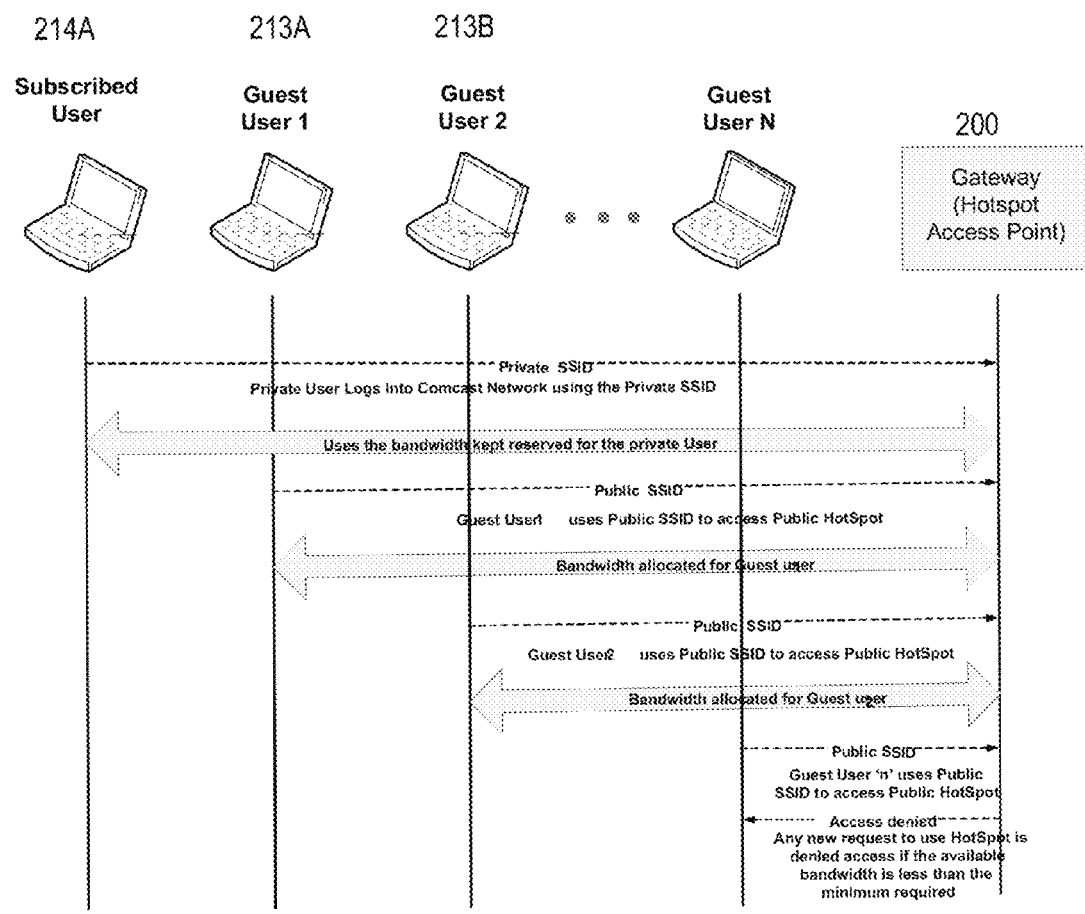
FIG. 10 illustrates some examples of message flow between users and a hotspot in one exemplary embodiment in accordance with various aspects of the disclosure.

Referring to FIG. 10, in accordance with various aspects of the disclosure a user device 214A may communicate with a gateway 200 using a private network identifier. Meanwhile, other user devices 213A, 214A may also communicate with the gateway 200 using a public network identifier. The bandwidth allotted to each user device 214A, 213A, 213B may be based on the amount of bandwidth available. For example, if a new guest user attempts to connect to the hotspot, if sufficient bandwidth is not available, then access may be denied.

Figure 8:
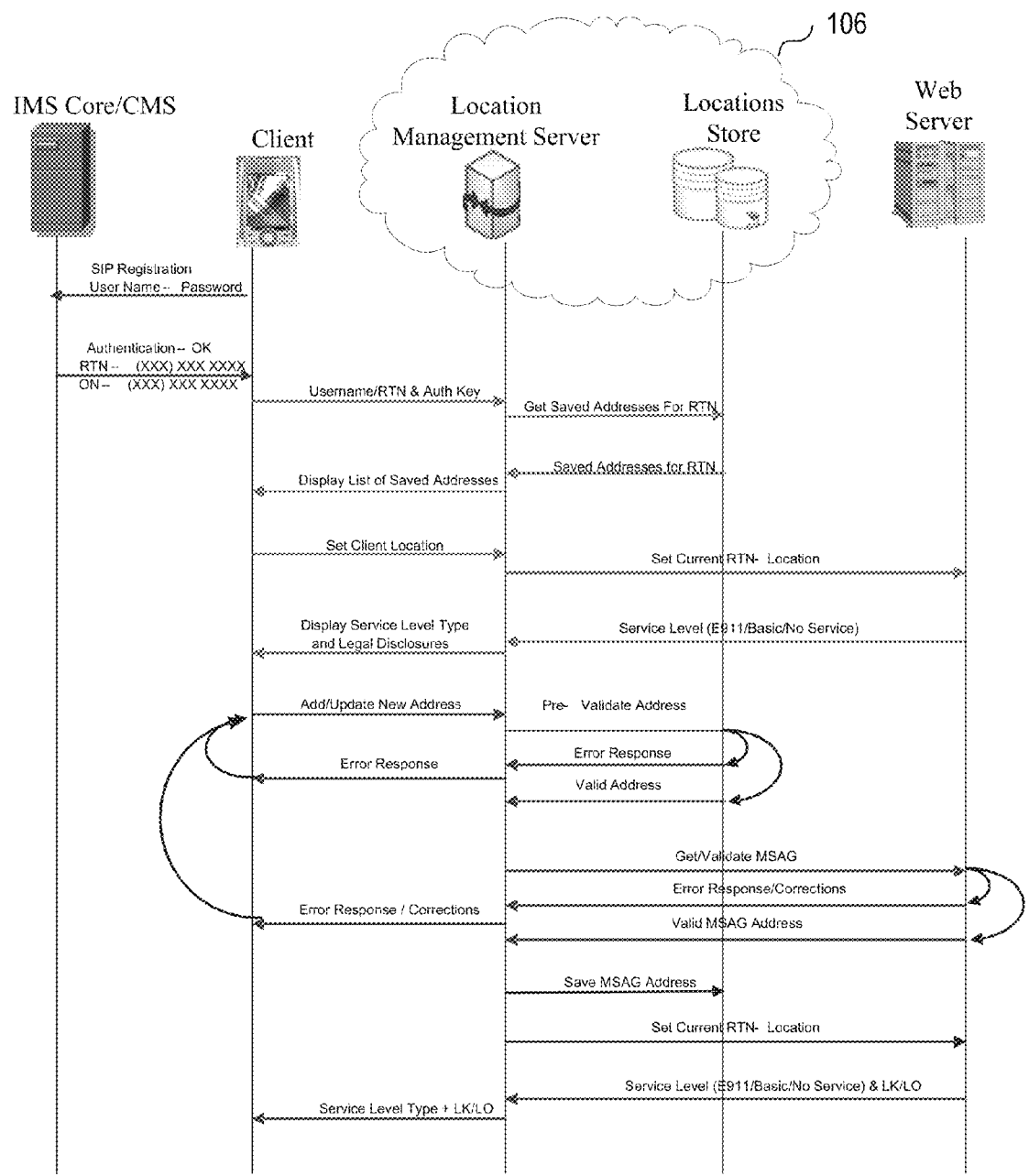
FIG. 8 illustrates communication among numerous devices assisting in location management in accordance with various aspects of the disclosure.

In another example, the electronic memory or memories 208 in the apparatus 200 may store numerous computer-executable modules, including an automatic location management module 210E that is configured to track an approximate location of user devices 213A, 214A. In one example, the module 210E may communicate with a global positioning satellite (GPS) enabled chip in the apparatus 200 to determine the approximate location of a user device connected to the apparatus 200. In another example, the module 210E uses a token corresponding to the apparatus 200 managed by a remote network system 220 to determine the location of a user device connected to the apparatus 200. For example, the token may be a customer premise equipment (CPE) token assigned by the service provider that corresponds to the apparatus 200. The service provider may operate the remote network system 220 and control the dissemination of CPE tokens. One skilled in the art will appreciate that although a CPE (or other token-based approach) may not produce results as accurate as a global positioning satellite (GPS) based system, the approximate location returned may be sufficient for E911 and other such requirements. In some example, referring to FIG. 8, to comply with the legal regulations for emergency services, a user device (i.e., a user) may need to enter their location whenever he/she accesses an apparatus 200 for voice services. Moreover, the remote network system 220 may transmit a location command that causes the automatic location management module 210E to track the approximate location of the user devices using a token managed by the remote network system. The module 210E may reply with a message containing the approximate location to the remote network system 220 for storage (per legal requirements). The remote cable network 106 may further comprise a location management server machine and a location data store, as depicted in FIG. 8. These systems may assist a remote cable network system 220 in location management.

In another example, the electronic memory or memories 208 in the apparatus 200 may store numerous computer-executable modules, including an activity-based location module 210H that is configured to determine an approximate location of the user based on an activity level of a user device over an interval of time. The remote network system 220 may transmit an activity-based location command that causes an activity-based location module 210H stored in local memory 208 to determine an approximate location of a user based on an activity level of a user device 213A. For example, a user participating on an instant messenger application on user device 213A may indicate to the activity-based location module 210H that a user is physically locatable at the user device 213A interface. Therefore, services, e.g., emergency notifications, may be appropriately sent to the user device 213A interface to immediately notify the user.

The apparatus 200 communicates with and receives commands from a remote service provider network system 220. In particular, computer-executable modules (e.g., modules 210A, 210B, etc.) stored in the apparatus 200 facilitate communications with the remote network system 220. The remote network system 220 may store one or more modules corresponding to the numerous modules (e.g., modules 210A, 210B, etc.) that may be found in an apparatus 200. These corresponding modules 220C may be executed by one or more processors 220A in the remote network system 220. For example, a corresponding module 220C may communicate with a session management module 210C and maintain session data for numerous user devices (e.g., 213A, 213B, 214A, etc.) in memory. The session data may be retrieved and transmitted to an apparatus and/or user device when requested, as explained earlier. Furthermore, the remote network system 220 may store network identifiers (e.g., for one or more public networks) and transmit the identifiers to apparatuses (e.g., 200, 216A, 216B, etc.) with a network management command. The remote network system 220 may maintain a table mapping each command to a corresponding hexadecimal (or other format) command, as explained earlier. In addition, the remote network system 220 may store a table containing user authentication information (i.e., an authentication table) that identifies those user and/or user devices that an authentication module 210F may permit to access the network. The remote network system 220 may also maintain rules (e.g., if-else statements, in programming vernacular) that instruct a bandwidth negotiation module 210G about how to manage bandwidth allocation, as explained earlier. The remote network system 220 may, in one embodiment, allocate bandwidth statically, or in some embodiments, dynamically based on the demand of each apparatus 200, 216A, 216B, 216C, 216D.

Figure 4:
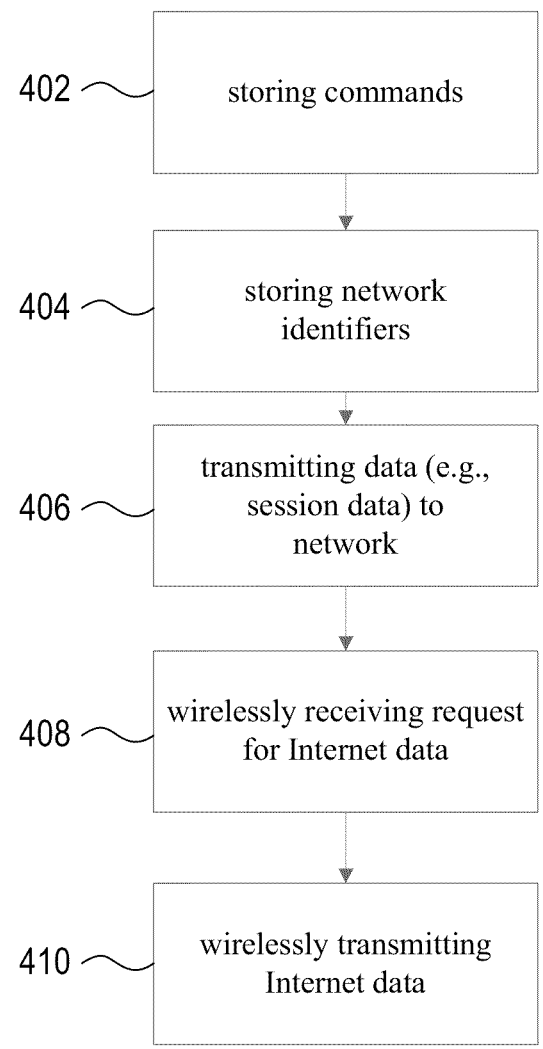
FIG. 4 is a flowchart illustrating one or more steps performed in accordance with various aspects of the disclosure.

FIG. 4 is a flowchart illustrating steps performed by various components and/or modules in an apparatus 200 in accordance with various aspects of the disclosure. One or more of these steps may be performed in an order different than that depicted in FIG. 4, or may be optional. Moreover, in some embodiments, the steps may be executed based on user intervention and may be changed based on design.

In step 402, the apparatus 200 stores commands received through a modem component 204 in local memory 208. As explained earlier, the commands are transmitted from a remote service provider network system 220 where at least a portion of the transmission is over a wired network. Furthermore, in step 406 the apparatus 200 stores in local memory 208 network identifiers for at least some of the plurality of networks it is configured to communicate with. A first user device 214A may communicate over a private network 214 corresponding to the private network identifier, and a second user device 213A may communicate over a public network 213 corresponding to the public network identifier. In step 406, the apparatus 200 transmits data to the remote network system 220. That data includes, but is not limited to, session data stored in local memory 208 that is sent from a session management module 210C in response to receiving a session transfer command at the apparatus 200. In step 408, user devices (e.g., 213A, 214A, etc.) may wirelessly transmit a request for data (e.g., Internet data) to the wireless communications component 206 of an apparatus 200. Examples of Internet data include, but are not limited to, data from the world wide web, e-mail data over SMTP, data over FTP, and other data sent over communication protocols. The apparatus 200, in step 410, wirelessly transmits the Internet data received from the upstream connection (e.g., through remote telecommunication equipment 222A) in response to the request for Internet data to the appropriate user devices. The user devices 213A, 214A may comprise a display interface and/or I/O interface for displaying/outputting at least some of the data transmitted.

Moreover, in accordance with various disclosed aspects, the operating environment of FIG. 2 may include a repeater 213C that allows apparatus 200 to expand the geographic coverage area of its network by extending the network signal. In such an example, user device 213D may be able to access the same network as user device 213A. At least one benefit of such a configuration is the expanded network coverage afforded to the service provider with reduced additional deployment cost.

Furthermore, user devices 214A, 214B, 213A, 213B may be able to query and select an appropriate hotspot (e.g., apparatus 200, 216A, 216B, 216C, 216D) which supports optimized routing based on performance, bandwidth, and/or cost. For example, the optimized routing algorithms may be built inside the network and options may be provided to the interface (e.g., display screen) of the user devices for selection. Alternatively, the network may perform the selection automatically (e.g., based on default setting or predetermined rules) without selection by the user. Some examples of optimized routing algorithms include, but are not limited to, least cost routing (e.g., a routing path with least cost), bandwidth intensive routing (e.g., a routing path to maximize bandwidth and QoS, based on the application type), least congestion routing (e.g., a routing path to reduce dropping of packets, e.g., to support voice services), customer routing (e.g., a routing path that stays on the provider's network as much as possible across networks), and other comparable routing techniques.

Although not required, one of ordinary skill in the art will appreciate that various aspects described herein may be embodied as a method, a data processing system, or as a computer-readable medium storing computer-executable instructions. Aspects have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure. In addition, the steps described herein may be performed using a processor executing computer-executable instructions or modules stored on a computer-readable medium. Generally, modules may include routines, programs, objects, components, data structures, etc. that perform particular tasks or implement particular abstract data types. The processor may also be in communication with a display screen for outputting the appropriate information in accordance with aspects of the disclosure. Aspects may also be practiced in distributed computing environments where tasks are performed by remote processing devices that are linked through a communications network. In a distributed computing environment, program modules may be located in both local and remote computer storage media including memory storage devices.

We claim:

1. A wireless communications device comprising:
a geographic positioning device configured to determine a geographic location of the wireless communications device;
at least one processor; and
a memory storing instructions that, when executed by the at least one processor, cause the wireless communications device to perform the following:
maintain separate public and private wireless networks;
establish a communication session with a first wireless device on the public wireless network;
wirelessly transmit a public network identifier to the first wireless device after receipt of a network management command, wherein the network management command includes the public network identifier corresponding to the public wireless network of the wireless communications device;
pass session data to a second wireless communications device to permit the first wireless device to maintain the communication session while moving from the public wireless network of the wireless communications device to a wireless network of the second wireless communications device; and
determine an approximate geographic location of the first wireless device based on the geographic location of the wireless communications device determined by the geographic positioning device and based on an activity level of the first wireless device over an interval of time, wherein the determining of the approximate geographic location of the first wireless device comprises using a token associated with the wireless communications device.

2. The wireless communications device of claim 1, wherein the wireless communications device is configured to pass the session data in response to receiving a session transfer command from a service provider system.

3. The wireless communications device of claim 1, comprising:
a modem component configured to communicate with a service provider system over at least a wired network; and
a wireless communications component configured to wirelessly communicate with the first wireless device;
wherein the memory further stores instructions that, when executed by the at least one processor, cause the wireless communications device to:
report the approximate geographic location to the service provider system.

4. The wireless communications device of claim 1, wherein the session data comprises information associated with data communicated on the public network by the first wireless device.

5. A computer method comprising:
establishing a communication session with a first wireless device on a public wireless network of a first wireless communication device, wherein the first wireless communication device establishes the public wireless network in response to receiving a network management command comprising a public network identifier associated with the public wireless network; wherein the first wireless communication device maintains the public wireless network and a private network;

passing session data to a second wireless communication device to permit the first wireless device to maintain the communication session while moving from the public wireless network of the first wireless communication device to a public wireless network of the second wireless communication device;

determining an approximate geographic location of the first wireless device based on a geographic location of the second wireless communication device and based on a user activity level of the first wireless device over an interval of time, wherein determining the approximate geographic location comprises using a token; and wherein the second communication device comprises a geographic positioning device configured to determine the geographic location of the second wireless communication device.

6. The method of claim 5, wherein the network management command is transmitted from a service provider system.

7. The method of claim 5, wherein the passing session data to the second wireless communication device includes:

transmitting the session data to a service provider system that passes the session data to the second wireless communication device.

8. The method of claim 5, wherein the private wireless network is separately encrypted from the public wireless network.

9. The method of claim 5, wherein the public wireless network is dynamically configurable from a service provider system, and wherein the private wireless network is configured to operate on a separate channel than the public wireless network.

10. The method of claim 5, wherein the establishing the communication session with the first wireless device on the public wireless network, comprises:

restricting use of the public wireless network to wireless devices approved by an authentication module.

11. The wireless communication device of claim 1, wherein the token includes a customer premise equipment token.

12. The method of claim 5, further comprising:

wherein the first wireless communication device comprises a geographic positioning device configured to determine the geographic location of the first wireless communication device.

13. The method of claim 5, wherein the determining of the approximate location further comprises:

determining that a user is participating in an instant messaging conversation using an instant messaging application on the first wireless device;

identifying an approximate location of the user to be the same as the approximate location of the first wireless device; and after the identifying the approximate location of the user, receiving at the first wireless device, notifications configured to immediately notify the user.

14. An apparatus comprising:

at least one computer processor; and a computer memory storing computer-executable instructions that, when executed by the at least one processor, cause the apparatus to:

maintain separate public and private wireless networks within a wireless range of a first wireless communications device;

establish a communication session with a first wireless device on the public wireless network;

wirelessly transmit a public network identifier to the first wireless device after receipt of a network management command, wherein the network management command includes a public network identifier corresponding to a public wireless network of the first wireless communications device;

pass session data to a second wireless communications device to permit the first wireless device to maintain the communication session while moving from the public wireless network of the first wireless communications device to a wireless network of the second wireless communications, wherein the first wireless communications device comprises a geographic positioning device configured to determine a geographic location of the first wireless communications device, wherein the second wireless communications device comprises a geographic positioning device configured to determine a geographic location of the second wireless communications device; and determine an approximate geographic location of a user of the first wireless device based on an user-activity level of the first wireless device over an interval of time, wherein an approximate geographic location of the first wireless device is based on the geographic location of the second wireless communications device determined by the geographic positioning device in the second wireless communications device, where determining the approximate geographic location of the first wireless device includes tracking the approximate location of the first wireless device using a token.

15. The apparatus of claim 14, wherein the memory further stores instructions that, when executed by the at least one processor, cause the apparatus to:

send an approximate geographic location of the first wireless device to a service provider system.

16. A method comprising:

maintaining, by a wireless communications device comprising a geographic positioning device, separate public and private wireless networks;

establishing a communication session with a first wireless device on the public wireless network;

wirelessly transmitting a public network identifier to the first wireless device after receipt of a network management command, wherein the network management command includes a public network identifier corresponding to the public wireless network of the wireless communications device;

passing session data to a second wireless communications device to permit the first wireless device to maintain the communication session while moving from the public wireless network of the wireless communications device to a wireless network of the second wireless communications device; and determining an approximate geographic location of the first wireless device based on the geographic location of the wireless communications device determined by the geographic positioning device and based on a user activity level of the first wireless device over an interval of time, wherein the determining of the approximate geographic location of the first wireless device comprises using a token associated with the wireless communications device.

17. The method of claim 16, wherein the wireless communications device is configured to pass the session data in response to receiving a session transfer command.

18. The method of claim 16, wherein the wireless communications device comprises a modem component configured to communicate with a service provider system over at least a wired network and a wireless communications component configured to wirelessly communicate with the first wireless device, the method comprising:

reporting the approximate geographic location to the service provider system.

19. The method of claim 16, wherein the session data comprises information associated with data communicated on the public network by the first wireless device.

* * * * *